UNITED STATES PATENT OFFICE

KARL WILKE, OF HOCHST-ON-THE-MAIN, GERMANY, ASSIGNOR TO GENERAL ANILINE WORKS, INC., OF NEW YORK, N. Y., A CORPORATION OF DELAWARE

PROCESS OF PREPARING ORTHO-AMINOALDEHYDES OF THE ANTHRAQUINONE SERIES

No Drawing. Application filed March 3, 1927, Serial No. 172,555, and in Germany March 8, 1926.

My present invention relates to ortho-aminoaldehydes and ortho-aminoketones of the anthraquinone series.

I have found that ortho-aminoaldehydes and ortho-aminoketones of the anthraquinone series are obtained by treating with a reducing agent the reaction products which are formed for instance by the action of fuming sulfuric acid upon α-nitro-β-alkylanthraquinones at a low temperature and which are insoluble in cold alkalies and distinguished by their great reactivity (see for instance U. S. Patent No. 1,417,875). The products corresponding to the 1-nitro-2-methylanthraquinones are thus converted into the ortho-aminoaldehydes, the products corresponding to the 1-nitro-2-ethylanthraquinones, however, into the ortho-aminoketones. This reaction shows that the above-mentioned intermediate products are anthraquinoneisoxazoles and proves the correctness of the supposition as regards their constitution which could hitherto only be deduced from the empiric composition determined by analysis. The manner in which these products are formed does not indicate a priori that

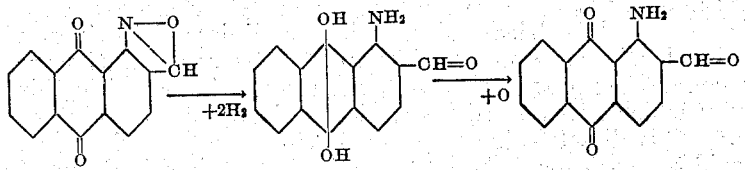

that they constitute isoxazole derivatives. Nor could it be foreseen whether and how far an isoxazole of the anthraquinone series would have the well-known properties of the isoxazoles of other classes of substances.

The preparation of the anthraquinoneisoxazoles may advantageously be combined with the preparation of aminoanthraquinone aldehydes and aminoanthraquinone ketones so that only a single operation is required in each case.

The following examples serve to illustrate my invention, but they are not intended to limit it; the parts are by weight:

(1) Preparation of 1-aminoanthraquinone-2-aldehyde having the formula:

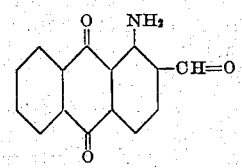

1 part of anthraquinone-1.2-isoxazole (which is obtainable for instance by the action of fuming sulfuric acid upon 1-nitro-2-methylanthraquinone) is mixed with 2 parts of sodium hydrosulfite in an aqueous ammoniacal solution and the mixture is heated on the water bath, while excluding air, until the mass is dissolved. By subsequently introducing air into the filtered solution, the 1-aminoanthraquinone-2-aldehyde separates in the form of red crystalline flakes. The compound is insoluble in water, acids and alkalies, scarcely soluble in alcohol and ether, readily soluble in boiling benzene, toluene, glacial acetic acid and amyl alcohol. It melts at 239° C. It dissolves in an ammoniacal hydrosulfite solution to a red, in a caustic alkaline solution to a green solution. It is formed in accordance with the following equations:

(2) Preparation of 1-amino-2-acetylanthraquinone (1-aminoanthraquinone-2-methylketone) having the formula:

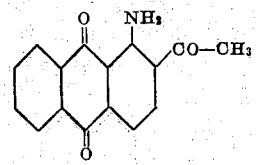

If in the foregoing example for the product obtainable from 1-nitro-2-methylanthraquinone and fuming sulfuric acid is substituted the anthraquinone-1.2-methylisoxazol obtainable by causing fuming sulfuric acid to act upon 1-nitro-2-ethylanthraquinone, and the further operations are carried out in the manner indicated in example 1, the 1-amino-2-acetylanthraquinone is obtained, which, when recrystallized from glacial acetic acid, forms coarse red needles melting at 220° C. It dissolves in an ammoniacal hydrosulfite solution to a reddish-yellow, in a caustic alkaline solution to a brown solution.

(3) A thin paste of anthraquinone-1.2-isoxazole (cf. Example 1 of U. S. patent specification No. 1,417,875), to which an excess of sodiumbisulfite solution has been added, is heated to boiling until the yellow color of the isoxazole has disappeared and a red, finely crystalline precipitate is formed, which is filtered by suction, washed and dried. The product is 1-aminoanthraquinone-2-aldehyde and identical with the product obtainable according to Example 1.

(4) 100 parts of 1-nitro-2-methylanthraquinone are mixed while stirring at 5-10° C. with 600 parts of fuming sulfuric acid containing 60% of anhydride, and the melt thus produced is diluted, while cooling, with 900 parts of sulfuric acid of 90% strength. Into the resulting solution of anthraquinone-1.2-isoxazole is run a solution of 210 parts of ferrous sulfate in 500 parts of water, while maintaining the temperature at about 30-40° C. The mixture is then poured in water, the precipitating 1-aminoanthraquinone-2-aldehyde is filtered and washed first with water, then with a diluted alkali, again with water, and finally dried.

(5) A paste of the 5-nitroanthraquinone-1.2-isoxazole (obtainable by introducing, while cooling, 1 part of 1.5-dinitro-2-methylanthraquinone into about 15 parts of fuming sulfuric acid containing 40% of anhydride, and diluting with water), is mixed with an excess of ferrous sulfate and heated to boiling until the yellow color of the isoxazole has disappeared and a reddish-brown precipitate is formed. When dried and recrystallized from chlorobenzene or glacial acetic acid, the precipitate forms a brown crystalline powder which gives a red mark and melts at 228° C. It dissolves in concentrated sulfuric acid to a pale reddish-yellow solution which, on the addition of formaldehyde, changes to a deep blue. It gives with alkaline hydrosulfite a vat of a spendid green color. Analysis shows that 1-amino-5-nitroanthraquinone-2-aldehyde is formed. The reaction may be represented as follows:

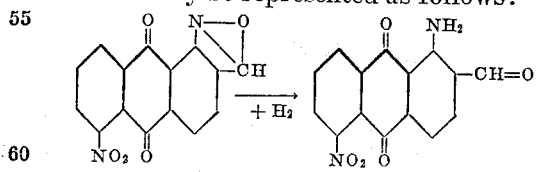

(6) 10 parts of anthraquinone-1.2-isoxazole and 6 parts of aniline sulfate are dissolved in 100 parts of concentrated sulfuric acid and heated up to 170° C. The whole is then cooled, the 1-aminoanthraquinone-2-aldehyde is precipitated by means of water, and after addition of a solution of some common salt, filtered, washed and dried. Its yield amounts to about 97% of the theory.

(7) Preparation of 1.5-diaminoanthraquinone-2.6-dialdehyde having the formula:

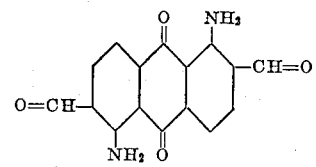

1 part of 1.5-dinitro-2.6-dimethylanthraquinone is introduced, while well cooling, into 15 parts of fuming sulfuric acid containing 65% of anhydride. The resulting 1.2.5.6-diisoxazole is introduced into a dilute solution of sulfuric acid containing an excess of ferrous sulfate and stirred at the temperature of the water bath until the brownish-yellow color of the suspended body has changed to a dark red. The reaction product is filtered by suction, washed and dried. It constitutes a red powder, which crystallizes from nitrobenzene in violet-red needles of the melting point 340° C. The color of its solution in concentrated sulfuric acid is brownish-yellow, which on addition of formaldehyde changes to blue. It gives with alkaline hydrosulfite a vat of an emerald-green color.

(8) Preparation of 1.8-diaminoanthraquinone-2.7-dialdehyde having the formula:

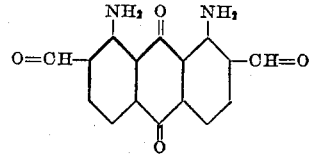

If for the 1.5-dinitro-2.6-dimethylanthraquinone as used in example 7 is substituted the 1.8-dinitro-2.7-dimethylanthraquinone and the further operations are carried out in the manner indicated in this example, there is obtained by way of the anthraquinone-1.2.8.7-diisoxazole the 1.8-diaminoanthraquinone-2.7-dialdehyde as a bluish-red paste which, after drying, forms a dark-red powder. The substance crystallizes from nitrobenzene in dark-violet needles dissolving in concentrated sulfuric acid to a brownish-yellow solution. The vat prepared therefrom with alkaline hydrosulfite has a green color.

I claim:

1. A process which comprises treating an anthraquinone-α-β-isoxazole compound of the series including anthraquinone-1.2-isoxazole, anthraquinone-1.2.5.6-diisoxazole, anthraquinone-1.2.8.7-diisoxazole, with a reducing agent.

2. A process which comprises reducing an anthraquinone-α-β-isoxazole compound of the series including anthraquinone-1.2-isoxazole, anthraquinone-1.2.5.6-diisoxazole, anthraquinone-1.2.8.7-diisoxazole, with ferrous sulfate.

3. Process of preparing 1-amino-anthraquinone-2-aldehyde having the formula

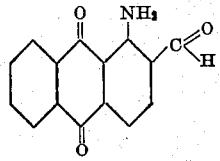

which comprises treating anthraquinone-1.2-isoxazole with a reducing agent.

4. Process of preparing 1-amino-anthraquinone-2-aldehyde having the formula

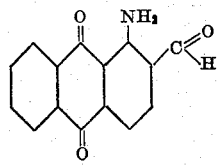

which comprises reducing anthraquinone-1.2-isoxazole with ferrous sulfate.

In testimony whereof, I affix my signature.

KARL WILKE.